Feb. 20, 1968  R. E. BACH ET AL  3,369,408
UNIVERSAL PROBE MOUNTING APPARATUS
Filed Jan. 11, 1965  4 Sheets-Sheet 1

Richard E. Bach
Donald J. Tompos
INVENTORS

BY
James J. O'Reilly
AGENT

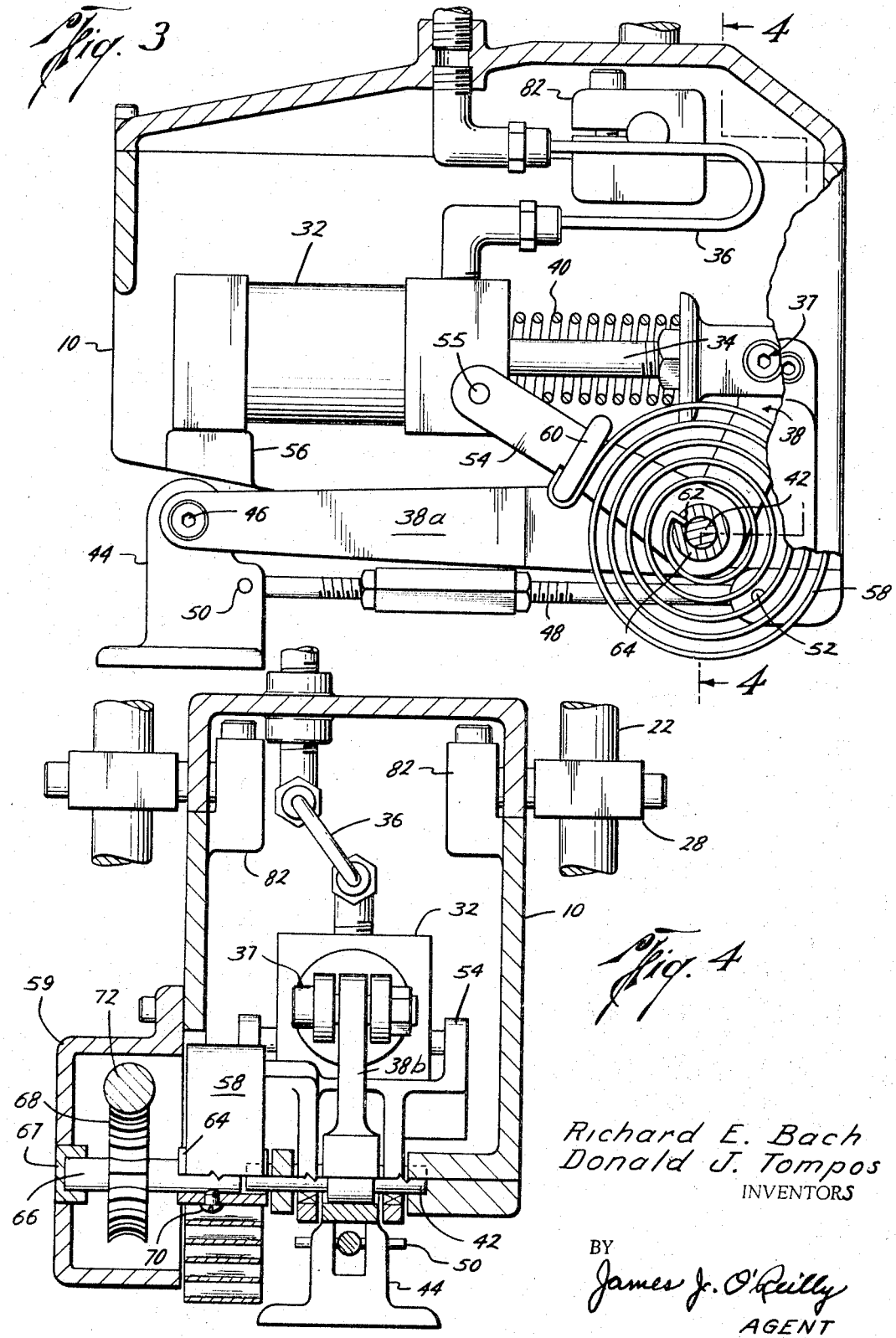

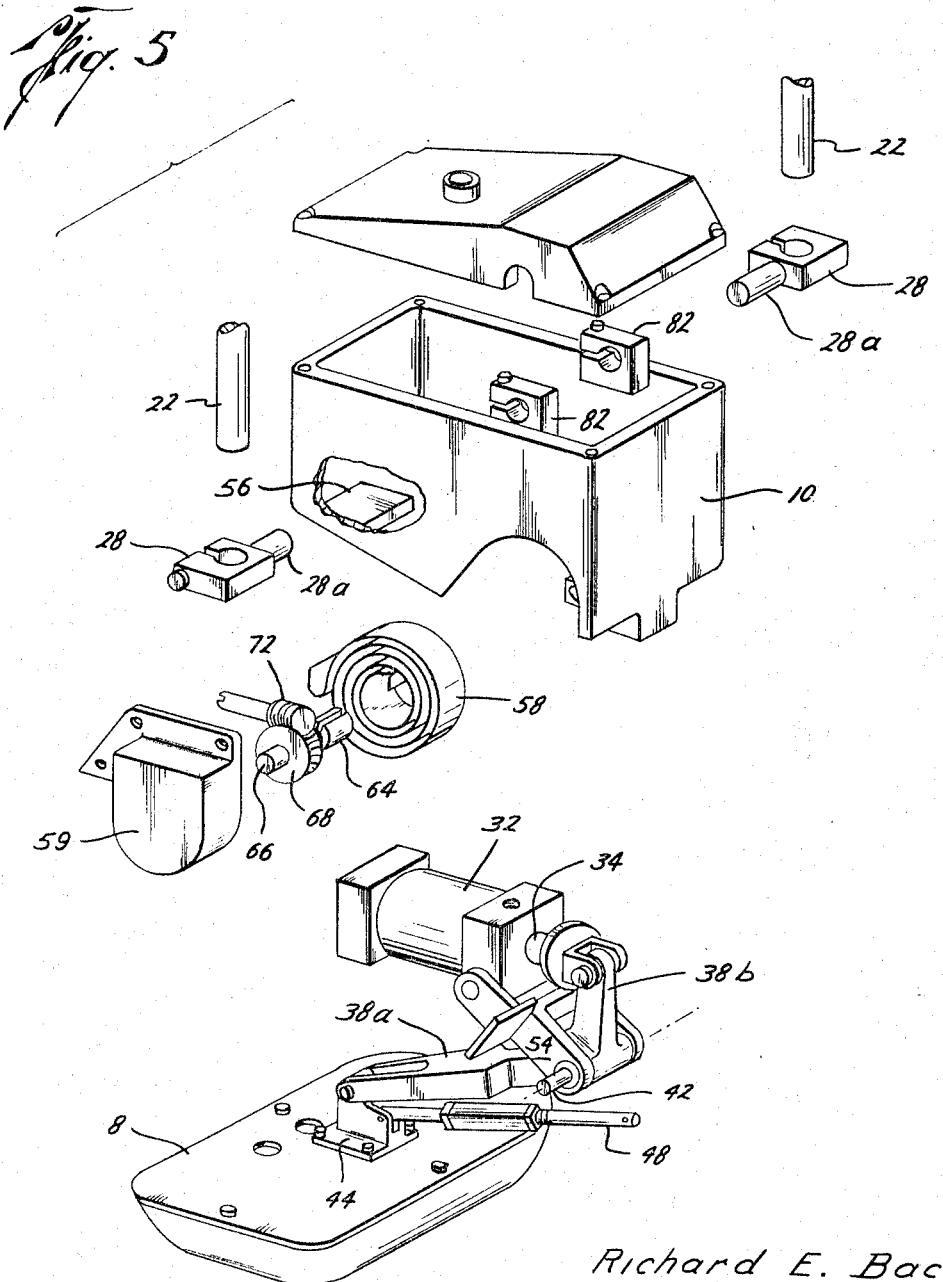

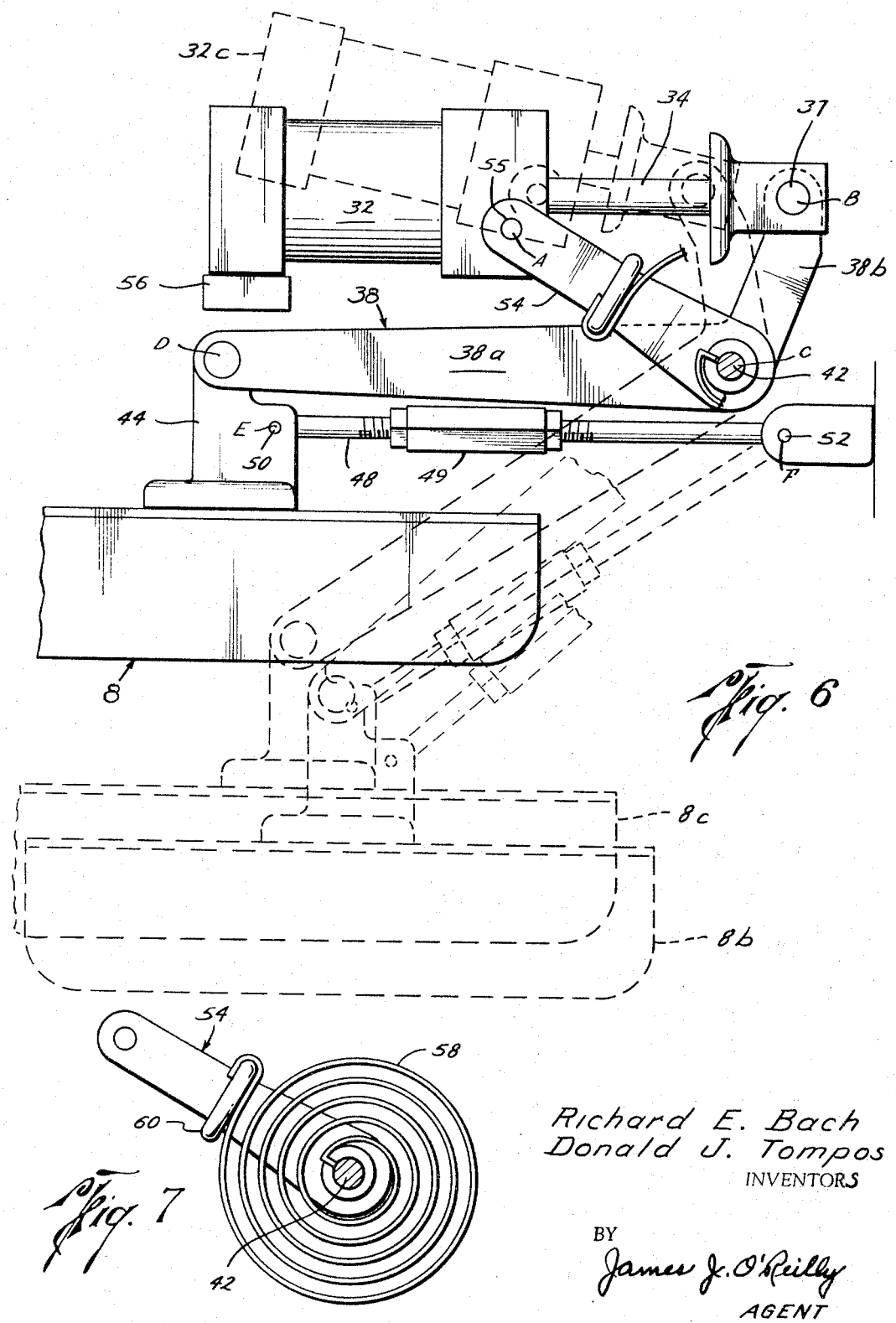

> United States Patent Office 3,369,408
Patented Feb. 20, 1968

3,369,408
UNIVERSAL PROBE MOUNTING APPARATUS
Richard E. Bach, Hilliard, and Donald J. Tompos, Kettering, Ohio, assignors to Industrial Nucleonics Corporation, a corporation of Ohio
Filed Jan. 11, 1965, Ser. No. 424,499
12 Claims. (Cl. 73—432)

ABSTRACT OF THE DISCLOSURE

An actuating linkage for positioning a probe against a sheet to be measured wherein an air cylinder is supported from an axle about which the linkage pivots. The piston rod of the cylinder is connected to one end of the linkage and extended to position the probe against the sheet. A spring torsion member is connected between the axle and the cylinder support to rotate the cylinder about the axle when the piston rod is fully extended as the probe follows the sheet.

---

This invention relates generally to industrial gauging apparatus and more particularly to a universal mounting apparatus for a material sensing probe.

Most industrial gauging systems require the sensing of one or more variables of the product by means of either a material contacting shoe or probe or a non-contacting device such as a radiation absorption gauge. This invention relates primarily to the contacting type sensing device that must be maintained firmly against the material to provide useful process information. One example, is a probe that responds to variations in the moisture of the sheet against which it is placed. Another example is a magnetic field sensor that receives flux driven through the material to measure caliper. It is important for the probe to exert at least a minimum amount of pressure against the material to insure a high signal-to-noise ratio in the measurement channel. Too high a pressure on the material will cause rupture thereof and is a condition to be avoided.

In continuous processes, fluttering of the produced material causes the probe to bounce along the product resulting in periodic deterioration of the signal. Some prior art devices have attempted to suspend the probe from a spring member that acts to support some of the weight of the probe. One type of such a device is described in a copending appliaction Serial No. 357,863 filed Apr. 2, 1964, now U.S. Patent 3,332,279. Other approaches use a counterbalance weight as described in U.S. Patent 3,143,886 issued Aug. 11, 1964 to P. Lippke. It is noted that these devices are mounted to follow a horizontally moving sheet wherein the probem of sheet flutter is somewhat minimized; however, it is frequently impossible to measure at a point in the process where the material flows in a horizontal direction because of either space limitations or the design of the processing equipment. As the angle of inclination with respect to the horizontal, or pass angle becomes larger, the component of probe weight that acts perpendicular to the material becomes smaller. When measuring material travelling in a vertical plane, these devices are totally ineffective since there are no forces tending to hold the probe against the sheet.

We have solved these problems by providing a universal probe mounting that not only accommodates any angle of pass but also exhibits improved floating or material following capabilities. Our invention uses a unique actuator suspension mechanism that is both supported by and pivoted about a fixed axis. After extending the probe toward the sheet, the actuator floats about the pivot with the probe. Adjustable resilient means is provided to exert a torque about said axis whenever said probe is fully extended to establish an adjustable component of force perpendicular to the material being measured. A unique cantilever mounting of the actuator results in an extremely compact housing.

Accordingly, it is a primary object of the present invention to provide an improved probe mounting apparatus that enables the measurement of a material regardless of its angle of pass.

It is another object of the present invention to provide a probe mounting apparatus having improved floating characteristics.

It is also an object of the present invention to provide a probe mounting apparatus that requires less space than similar devices used heretofore.

It is still another object of the present invention to provide a probe mounting that is quickly and easily adjusted to suit a particular process line.

It is yet another object of the present invention to provide a probe mounting that requires little expense to fabricate and maintain in proper operating condition.

These and other objects and advantages of the present invention will become apparent upon reference to the following description when taken in conjunction with the accompanying drawings, in which:

FIGURE 3 is a sectional view of the housing showing the probe suspension mechanism constructed in accordance with the present invention;

FIGURE 4 is a section taken on the line 4—4 of FIGure 3.

FIGURE 5 is an exploded perspective view of the housing shown in FIGURE 1;

FIGURE 6 is a partial side view of the probe suspension mechanism showing the relative movements between the various members thereof;

FIGURE 7 is a side view of an alternate spring mounting; and,

Figure 1:
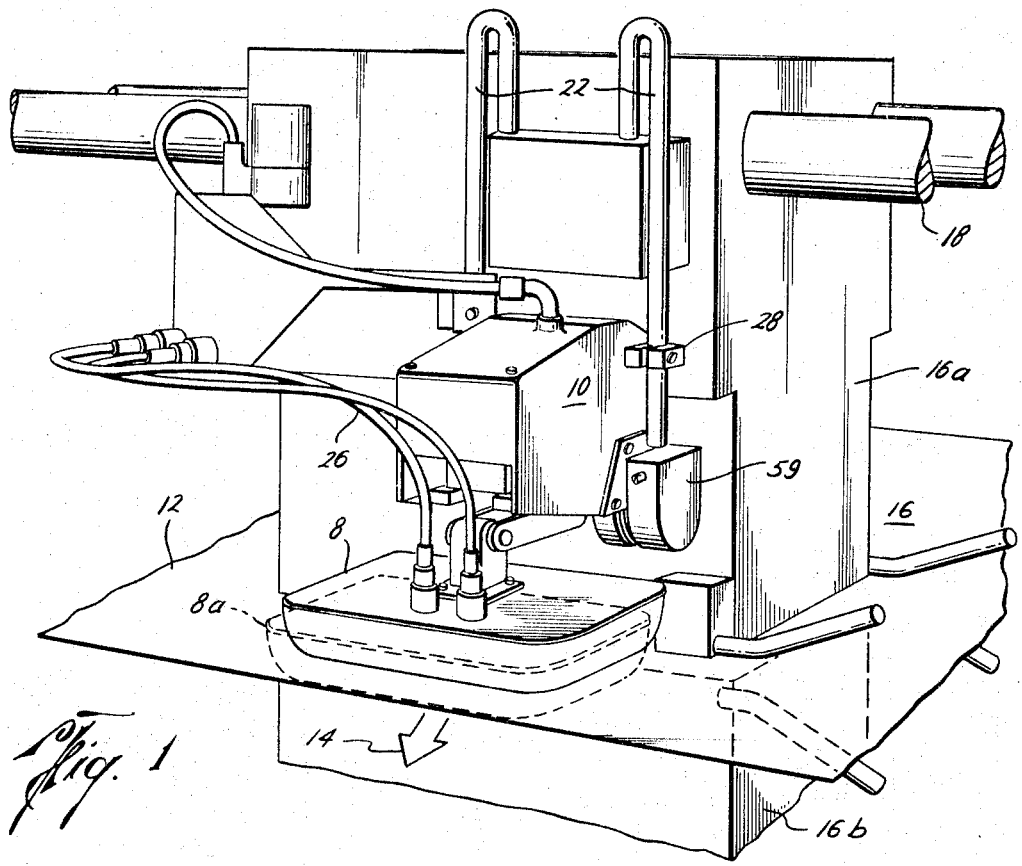
FIGURE 1 is an exterior perspective view of a housing for the probe suspension mechanism of the present invention.

With reference now to the drawings and specifically to FIGURE 1, we show a material measuring or sensing probe 8 mounted in a housing 10. The housing 10 is located above a sheet 12 which is travelling in the direction of the large arrow 14. The probe housing is mounted on the upper unit 16a of a two-piece housing for a scanning radiation transmission gauge 16. The gauge housing is movable across the sheet on traversing rods 18 that extend across the width of the sheet. The probe housing 10 is carried by a pair of inverted J-brackets 22 that are fastened to the upper housing 16a. The probe 8 comprises a generally rectangular solid having a flat face adjacent to the sheet 12. The probe 8 is held above the sheet 12 in the position shown when not measuring the material.

Sensing probe 8 may be constructed of any shape suitable for the material being measured and can be responsive, for example, to thickness, hydrogen content, moisture or other variable of interest. In a preferred embodiment, the probe 8 comprises a generally rectangular solid having a flat face adjacent to the sheet 12. The probe 8 may be considered to be essentially responsive to the moisture of the sheet 12 when it is lowered thereagainst by the actuating mechanism contained in the housing 10. When lowered to the dotted line position 8a, the probe delivers an electrical signal proportional to moisture over the pair of coaxial cables 26 emanating from the uppermost surface of the probe. The vertical position of the probe housing 10 is adjustable by means of a pair of mounting clamps 28 that grasp the end of the inverted J-brackets 22.

Figure 2:
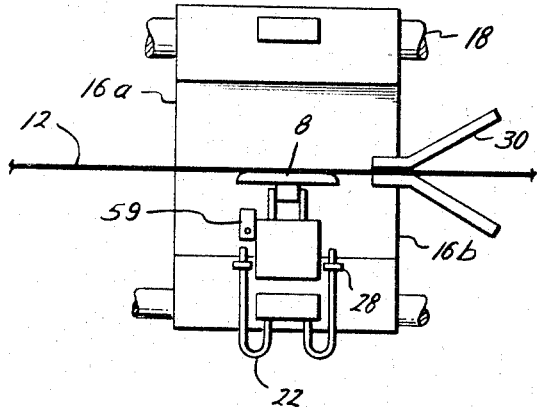
FIGURE 2 is a side view of an alternative probe mounting arrangement.

Referring to FIGURE 2, the unique probe mounting of the present invention may be mounted under the sheet as well as on top. In this case, the J-brackets are fastened to the lower transmission gauge unit 16b and the probe 8 has to be raised to contact the underside of the sheet 12. The transmission gauge units and the probe 8 all move as a unit from left to right across the sheet by means not shown. The angle brackets 30 on the right side of the transmission gauge units facilitate the movement of the traversing apparatus onto the sheet from an off-sheet position. It is recognized, of course, that the moisture probe mounting may be carried by its own traversing unit and it is not required to be associated with the transmission gauge 16 as shown. It will be further apparent hereinafter that the probe 8 may also be used to measure either side of a sheet tilted with respect to the horizontal. In fact, the probe mounting of the present invention may be used to measure a sheet travelling in a vertical plane as well. Not only does the probe 8 follow a sheet regardless of the orientation of the plane thereof with respect to the horizontal but it also rides against the sheet with a force of adjustable magnitude to assure positive contact with the sheet irrespective of its angle of pass.

The present invention provides a unique probe actuator suspension mechanism wherein the linkage means that couples the actuator to the probe pivots about an axle that also carries another linkage that carries or otherwise supports the actuator housing. The common pivotal mounting of the mechanical linkages enables the probe 8 and the actuator to move as a unit in a floating manner once the actuator is energized. The "hardness" or "softness" of float on the sheet 12 is determined by biasing or tension means acting against the probe linkage to maintain the probe 8 in continuous engagement with the sheet 12.

Referring now to FIGURES 3, 4, and 5, the compact construction of one embodiment that enables this unique sheet following capability is illustrated. Power for lowering the probe against the sheet may be provided by any suitable drive means such as an air cylinder 32 having an extended piston rod 34 and receiving a supply of air through an inlet conduit 36. The piston rod 34 is pivotally connected at 37 to one end of a crank arm 38 and is normally forced outwardly from the cylinder 32 by a helper spring 40 resting against the face of the cylinder 32. Another spring (not shown) is usually provided inside the cylinder 32 for extending the piston rod 34 whenever air pressure is relieved. Crank arm 38 having a long segment 38a and a short segment 38b pivots about an axle 42 mounted in the lower part of the housing 10. The longer portion 38a of the crank arm 38 carries a probe mounting bracket 44 which is pivotally fastened thereto by means of a bolt 46.

A stabilizer rod 48 is also pivotally connected to the probe mounting bracket 44 by means of a pin 50. The other end of the stabilizer rod 48 is pivotally pinned to the housing 10 as at 52. Rod 48 prevents rocking of the probe and carries a turnbuckle coupling 49 that adjusts the length of the rod 48 and accordingly the angle of tilt of the probe 8. The stabilizer rod 48 and the longer segment 38a of the crank arm 38 comprise a 4-bar linkage which maintains the probe parallel to the sheet as it is being placed thereagainst. A cylinder supporting member such as a clevis 54 is also pivotally mounted on the axle 42 and supports the air cylinder 32 at a pivot 55.

Disregarding for the present the probe tension adjustment and concentrating on the movements of the various members as the cylinder is energized, reference may be made to FIGURE 6. Generally, the six axes A–F of pivotal movement may be grouped into two sets of multiple parallel bar linkages. Pivot axes A, B, and C comprise a three-bar linkage involved in both supporting the actuator 32 and coupling the piston rod thereof to the crank arm 38. Pivot axes C, D, E, and F comprise a four-bar linkage used to couple the probe 8 to the actuator mechanism and also to maintain the face of the probe 8 continuously parallel to the sheet 12. It may be observed that the pivot axis C is common to both linkages and that all other axes (except E and F) move radially with respect to it.

Proceeding now with a more structural description of operation, air is admitted to the interior of cylinder 32 to retract the piston rod 34. The short segment 38b of the crank arm 38 moves to the left (as shown in FIG. 6) thereby causing the crank arm 38 to pivot about the axle 42. This causes the probe 8 to be carried downwardly by the other end of the crank arm 38. The distance through which the probe moves is determined principally by the relative proportion of the crank arm segments 38a and 38b and the length of the stroke of the piston rod 34. It is important to remember that during this actuation the air cylinder 32 remains resting against the stop 56 fastened to the housing 10, although some rocking occurs at the clevis pivot 55 to accommodate the arcuate motion of pivot axis B about axle 42.

Once the piston rod 34 is fully retracted the crank arm 38 is effectively locked together with the cylinder 32 and the supporting clevis 54. If a force R is directed upwardly against the lowered probe, in position 8b, both the probe 8 and the cylinder 32 will be raised, the cylinder assuming the dotted line position 32c. The force will be that required to impart a torque about the axle 42 (pivot axis C) equal to the combined torques of the cylinder 32, probe 8 and the mechanical linkages associated therewith.

To counteract or relieve part of this weight, a novel counterbalancing device is employed to provide a force tending to bias or urge the probe 8 away from the sheet. A resultant force equal to the difference betwen the combined downwardly acting weight and the counterbalance force holds the probe 8 against the sheet 12. If the probe 8 is designed to engage the underside of the sheet 12, the counterbalance device must not only overcome the combined weight of the mechanism but if must also exert whatever additional force is required to hold the probe 8 firmly against the sheet 12. In a preferred example, the counterbalance force is provided by torsion spring devices that establish a torque or moment about the axle 42 (pivot axis C) in the required sense.

Referring again to FIGURES 3, 4, and 5, in a preferred construction, a counterbalance member such as a coiled clock spring 58 may be used. Clock spring 58 is a power or motor spring device constructed of flat tempered spring material. The spring material is coiled around an axis or arbor in a plane transverse thereto to store energy which is released upon unwinding to provide a torque about the axis or arbor around which it is confined. Clock spring 58 is used to provide the force necessary to relieve approximately three-fourths of the combined downwardly acting weight of the mechanism. The outermost end of the clock spring 58 is curved to grasp the lower side of a tab 60 extending from the cylinder support clevis 54. The innermost end of the clock spring 58 is carried by a slot 62 provided in a sleeve 64 rotatable around axle 42. The sleeve 64 is fastened to another axle 66 rotatable in an end bearing 67 in the wall of a cover 59. The sleeve 64 may be pinned or fastened by means of a set screw 70 to the axle 66 to move concentrically around the crank arm-mounting axle 42 carried by the housing (best seen in FIGURE 4). A worm gear 72 engages a pinion gear 68 carried by the axle 66 to increase or decrease the amount of tension in the clock spring 58.

For example, a clockwise rotation of the axle 66 and sleeve 64, as observed in FIGURE 5, tightens the clock spring 58 to relieve more of the probe weight. If it is desirable, for example, to have a 16-ounce force exerted against the sheet, a calibrated spring scale may be attached to the probe while it is extended to the lowermost position 8b shown in FIGURE 6. The clock spring 58 is then tightened until the required force is indicated by the spring scale. This then will be the minimum force required to raise the probe 8 and cause the air cylinder 32 to lift from the stop 56 in a radial motion about the axle 42. It is apparent that the clock spring 58 unwinds as the extended probe 8 is pushed upward, say to the position 8c, and the counterbalance force is reduced, thereby putting more weight on the sheet 12. Accordingly, the housing 10 is mounted so that the probe 8 (when off-sheet) will extend about one-half an inch below the level of the sheet 12 when fully extended. The clock spring 58 is then adjusted until a 12-ounce pull is required to dislodge the cylinder 32 from the stop 56. Thereafter whenever the probe 8 is lowered to sheet level, the required 16-ounce force will be automatically provided against the sheet 12.

It may be apparent that the present invention does not impart any appreciable floating action to the probe 8 until the air cylinder 32 is energized and the crank arm 38 is drawn fully toward the cylinder 32 compressing the helper spring 40. Once this is accomplished, the cylinder 32, crank arm 38 and cylinder supporting clevis 54 all float or move in unison as an integral, fixed linkage in radial motion about axle 42 with the clock spring 58 providing the required probe pressure.

If the probe is to be mounted under the sheet as illustrated in FIGURE 2, it will be necessary to reverse the clock spring 58 as shown in FIGURE 7. In this orientation, the clock spring 58 engages the opposite side of the clevis tab 60 tending to force the probe 8 in an upward direction. Since a much greater tension must now be placed in the clock spring 58 to completely counteract the combined mechanism weight, a heavier spring may be desired. The helper spring 40 may be eliminated, since the weight of the probe acts in a direction that tends to re-extend the piston rod 34 should air pressure fail.

The operation of the under-the-sheet embodiment will become more apparent if FIGURES 6 and 7 are inverted and if the reader mentally replaces the spring of FIGURE 6 with that shown in FIGURE 7. The crank arm segment 38a rests on the frame of the probe housing 10 (not shown) and the cylinder 32 bears against the stop 56. Retraction of the piston rod 34 causes the probe 8 to move in an upward direction. The spring 58 serves to keep the probe 8 up and the cylinder 32 against the stop 56. Any downward displacement of the probe 8 winds up the spring 64 increasing the tension therein. Therefore, the resultant force on the sheet 12 will be greater the lower the probe 8 is made to ride. Accordingly, a tension adjustment procedure similar to the one described hereinabove can be employed to achieve the desired probe pressure at the "average" sheet position.

Figure 8:
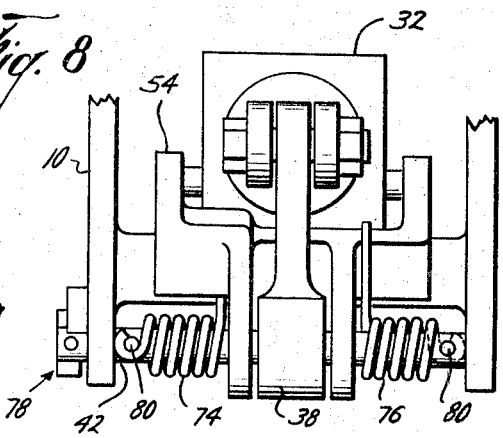
FIGURE 8 is a partial plan view of an alternative probe springing arrangement.

Referring now to FIGURE 8, a pair of helical torsion spring devices 74 and 76 may be used to facilitate the floating action of our invention. In this embodiment, the main axle 42 is adjustably rotatably mounted in the housing 10 and secured by a lock-nut arrangement 78 located at one end of the axle 42. Torsion springs 74 and 76 are provided around the axle 42 at either side of the rotatable support for the cylinder clevis 54. The axle 42 carried a pair of protruding pins 80 around which a curved end of each spring is trained. Each terminates in a straight extended portion that presses against either the upper or the lower side of the cylinder support clevis 54, depending on which side of the sheet the probe is to be mounted. One spring or the other acts against the cylinder support clevis 54 to provide the required sheet contacting force. It is apparent that only one spring is used at a time because, as the axle 42 is turned in a clockwise direction as viewed from the lefthand side, spring 74 is tightened and spring 76 is loosened and eventually becomes ineffective.

Regardless of the type of spring used, a force on the probe 8 is provided normal to the plane of the sheet being measured. This construction insures a positive sheet contacting force even if the sheet is travelling in a vertical plane. In some applications, the coiled clock spring 58 may provide a more uniform contacting force than the helical spring type.

It is instructive to discuss the action of the counterbalance springs for various pass angle mountings of the housing 10 with particular reference to the preferred clock spring 58. The housing 10 can be rotatably positioned by adjusting a pair of clamps 82 (see FIGURE 5) receiving cylindrical tab extensions 28a of the J-bar clamps 28. A horizontal sheet being measured by a top-mounted probe is taken as a zero degree reference angle. It may be observed that as the sheet is tilted, the component of weight that is exerted against the sheet diminishes as the cosine of the angle of tilt. Therefore, if a constant force is desired against the sheet, it is necessary to decrease the tension in the clock spring 58 at large pass angles. At pass angles near 90 degrees (a vertical sheet) the probe may tend to lift from the sheet since the component of weight normal to the sheet is quite small. For this reason, the clock spring 58 may be reversed and mounted as shown in FIGURE 7 when measuring pass angles greater than 75 degrees, for example. This insures a constant positive force against the sheet even when it is vertically disposed. At angles greater than 90 degrees, the probe is effectively under the sheet and the spring tension must be increased. It may be observed that the clock spring embodiment may operate more smoothly when making nearly vertical sheet measurements.

In summary, the probe 8 floats, when extended, with the air cylinder 32 against the action of the counterbalance spring devices. The probe 8 moves perpendicular or normal to the sheet. The unique operation of our probe actuation and suspension mechanism may be attributed to the multiple bar linkages A–B–C and C–D–E–F (see FIGURE 6) having in common the crank arm 38 pivotally mounted on the axle 42 and to the novel linkage counterbalancing expedients used to provide the required probe pressure.

Modifications may be made to our preferred embodiment which do not depart from the limits of the present invention as expressed and defined by the spirit and scope of the appended claims.

What is claimed is:
1. Mounting apparatus for a material contacting probe comprising:
   drive means,
   pivotally mounted linkage means connected between said drive means and said probe and pivotally mounted about a fixed axle adjacent to said material to position said probe thereagainst, and
   means for pivotally supporting said drive means from said fixed axle for movement about said axle.
2. Mounting apparatus for a material contacting probe, comprising:
   drive means,
   linkage means connected between said drive means and said probe,
   means for pivotally mounting said linkage means about a fixed axle adjacent to said material, and
   means for pivotally supporting said drive means only from said fixed axle for movement in unison with said probe about said axle.
3. Mounting apparatus for a material contacting probe, comprising:
   motor means having a drive member,
   mechanical linkage means connected between said probe and said drive member, means for pivotally mounting said linkage means for radial movement about a fixed axle adjacent to said material, and means for pivotally supporting said motor means only from said axle for radial movement about said axle in unison with said probe.

4. Mounting apparatus for a material contacting probe measuring either a horizontal or an inclined sheet, comprising:

drive means having a movable member, linkage means including a crank pivotally connected at one end to said movable member and pivotally connected at the other end to said probe, means for rotatably mounting said crank intermediate said pivotally connected ends on an axle adjacent to said sheet, means pivotally connected to said drive means for rotatably supporting said drive means from said axle, and tension means acting about said axle to urge said probe toward said sheet.

5. Mounting apparatus for a material contacting probe measuring either a horizontal or an inclined sheet, comprising:

drive means having a movable member, linkage means including a crank pivotally connected at one end to said movable member and pivotally connected at the other end to said probe, means for pivotally mounting said crank intermediate said pivotally connected ends on an axle adjacent to said sheet, means pivotally connected to said drive means for rotatably supporting said drive means from said axle, and a coiled clock spring mounted concentrically around said axle for urging said probe toward said sheet.

6. Mounting apparatus for a material contacting probe measuring either a horizontal or an inclined sheet, comprising:

drive means having a movable member, linkage means including a crank pivotally connected at one end to said movable member and pivotally connected at the other end to said probe, means for pivotally mounting said crank intermediate said pivotally connected ends on an axle adjacent to said sheet, means pivotally connected to said drive means for rotatably supporting said drive means from said crank pivotal mounting, and torsion spring means mounted coaxially with said axle for urging said probe toward said sheet.

7. Mounting apparatus for a material contacting probe measuring either a horizontal or an inclined sheet, comprising:

drive means having a movable member, linkage means including a crank pivotally connected at one end to said movable member and pivotally connected at the other end to said probe, means for rotatably mounting said crank intermediate said pivotally connected ends on an axle adjacent to said sheet, means pivotally connected to said drive means for rotatably supporting said drive means from said axle, and torsioning means for providing an adjustable torque about said axle to vary the pressure of said probe on said sheet.

8. Mounting apparatus for a material contacting probe measuring either a horizontal or an inclined sheet, comprising:

drive means having a movable piston rod, linkage means including a crank pivotally connected at one end to said piston rod and pivotally connected at the other end to said probe, means for rotatably mounting said linkage means intermediate said pivotally-connected ends on an axle adjacent to said sheet, a rigid member having one end pivotally mounted on said axle and the other end pivotally connected to said drive means to carry said drive means in radial movement about said axle in unison with said linkage and probe, and adjustable means for urging said probe toward said sheet.

9. Mounting apparatus for a material contacting probe measuring either a horizontal or an inclined sheet, comprising:

an air cylinder having a movable piston rod, linkage means including a crank pivotally connected at one end to said piston rod and pivotally conneced at the other end to said probe and means for stabilizing said probe, means for rotatably mounting said linkage means intermediate said pivotally-connected ends on an axle adjacent to said sheet, a clevis member pivotally mounted on said axle and pivotally connected to said air cylinder to carry said air cylinder in radial movement about said axle in unison with said linkage means and said probe, and adjustable torsion spring means providing a torque on said crank arm about said axle to urge said probe toward said sheet.

10. Apparatus as set forth in claim 9 in which said probe stabilizing means comprises:

a bar adjustable length having one end pivotally mounted on said probe and the other end pivotally mounted with respect to said axle to maintain said probe parallel to said sheet.

11. Apparatus as set forth in claim 9 in which said adjustable torsion spring means comprises:

a clock spring having one end engaging said linkage means, a rotatable member axially aligned with said linkage mounting axle, a sleeve fastened to said member for receiving the other end of said clock spring, and gear means for rotating said rotatable member with respect to said axle to alter the torque exerted against said linkage means by said clock spring.

12. Apparatus as set forth in claim 9 in which said adjustable torsion spring means comprises:

a first helical spring mounted around said axle for biasing said linkage means in one direction around said axle, a second helical spring of opposite wind mounted around said axle for biasing said linkage means in the opposite direction around said axle, each of said springs having an end fastened to said axle, and means for rotating said axle about the longitudinal axis thereof to increase the tension in one of said springs.

References Cited

UNITED STATES PATENTS

| | | | |
|---|---|---|---|
| 2,392,010 | 1/1946 | Stevens. | |
| 2,982,124 | 5/1961 | Knobel | 73—37.7 |
| 3,143,886 | 8/1964 | Lippke | 73—432 |
| 3,153,286 | 10/1964 | Buisson | 74—102 X |

DAVID SCHONBERG, *Primary Examiner.*